United States Patent [19]

Willmann

[11] Patent Number: 5,033,800
[45] Date of Patent: Jul. 23, 1991

[54] ANTI-SKID BRAKE SYSTEM

[75] Inventor: Karl-Heinz Willmann, Freiberg, Fed. Rep. of Germany

[73] Assignee: Robert Bosch GmbH, Stuttgart, Fed. Rep. of Germany

[21] Appl. No.: 542,129

[22] Filed: Jun. 22, 1990

[30] Foreign Application Priority Data

Sep. 20, 1989 [DE] Fed. Rep. of Germany ....... 3931307

[51] Int. Cl.$^5$ .............................................. B60T 8/32
[52] U.S. Cl. ..................................... 303/116; 303/113
[58] Field of Search ................ 303/116, 10, 113, 119

[56] References Cited

U.S. PATENT DOCUMENTS

| | | | |
|---|---|---|---|
| 4,608,870 | 9/1986 | Huber et al. | 73/708 |
| 4,640,558 | 2/1987 | Nomura et al. | 303/119 |
| 4,703,979 | 11/1987 | Nakanishi et al. | 303/116 |
| 4,715,667 | 12/1987 | Otsuki et al. | 303/116 X |

FOREIGN PATENT DOCUMENTS

| | | |
|---|---|---|
| 1655383 | 2/1974 | Fed. Rep. of Germany . |
| 1755906 | 5/1976 | Fed. Rep. of Germany . |
| 2036216 | 6/1980 | United Kingdom ................ 303/10 |

Primary Examiner—Matthew C. Graham
Assistant Examiner—Josie A. Ballato
Attorney, Agent, or Firm—Edwin E. Greigg; Ronald E. Greigg

[57] ABSTRACT

A vehicle brake system having an anti-skid system with, at least one anti-skid valve assembly disposed in a brake line that leads from the master brake cylinder to the wheel brake. To pump pressure fluid out of the wheel brake to the master brake cylinder, a return feed line is provided. Located in the return feed line, in succession in the pumping direction following a pressure fluid reservoir, are a throttle and a return feed pump driven by an electric motor. In order to keep the feedback at the brake pedal slight during an anti-skid control event involving small quantities of pressure fluid to be returned, yet to make sufficiently large quantities of pressure fluid available in the master brake cylinder upon major brake pressure reduction, the following provisions are made: The pumping flow of the return pump can be increased with increasing pressure in the pressure fluid reservoir and/or upon attainment of a predetermined fill level in the pressure fluid reservoir and/or with an increasing volumetric flow of pressure fluid to be pumped back out of the wheel brake.

7 Claims, 2 Drawing Sheets 5,033,800

ANTI-SKID BRAKE SYSTEM

BACKGROUND OF THE INVENTION

The invention is based on an anti-skid brake system as defined hereinafter. An anti-skid system of this kind is already known from German Patent 1 655 383 (FIG. 5), in which the pressure fluid reservoir is embodied as a cylinder with a spring-loaded piston, and a pressure switch for switching the return pump on and off is connected to the return feed line downstream of the throttle in the pumping direction. The return feed pump is switched on when a pressure is reached that because of the characteristic of the spring disposed in the pressure fluid reservoir is equivalent to a predetermined pressure fluid volume in the pressure fluid reservoir. The return feed pump, which has a constant pumping volume, pumps the pressure fluid out of the pressure fluid reservoir into the master brake cylinder. The pedal of this master brake cylinder is forced back as a result. Excessively long, forceful pedal motion is perceived as unpleasant by the vehicle driver, however. To reduce this feedback, the throttle in the return feed line is provided, which limits the pumped flow of pressure fluid to a low value. If there is a particularly marked decrease in brake pressure in the wheel brake during an anti-skid control event, however, the action of the throttle can produce an excess of pressure fluid in the pressure fluid reservoir and a lack of pressure fluid in the master brake cylinder. This situation cannot be tolerated, for safety reasons.

OBJECT AND SUMMARY OF THE INVENTION

The anti-skid brake system according to the invention has an advantage over the prior art that the master brake cylinder is always supplied with pressure fluid to an adequate extent, both during anti-skid brake control events and under conditions of either a slight or great reduction in brake pressure. Nevertheless, in the predominant number of anti-skid control events, with a slight brake pressure reduction the pedal feedback remains slight, because the pressure fluid reservoir at that time is filled to only a slight extent, and the return feed pump needs to furnish only a small pumping flow.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
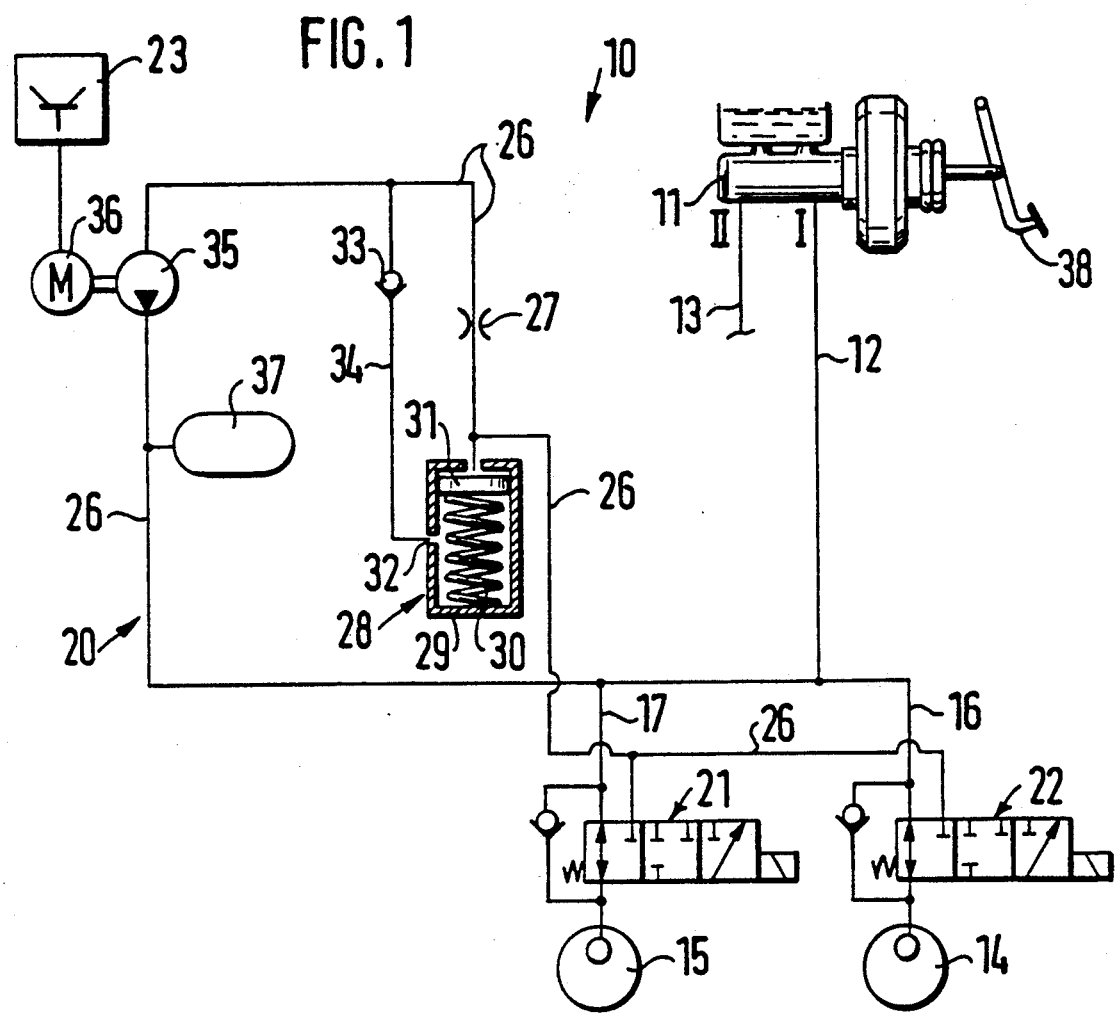
FIG. 1 is a diagram of a vehicle brake system, part of which is shown and which has an anti-skid system that has a pressure fluid reservoir connected to a return feed line by a throttle, in which as a first exemplary embodiment a bypass line for the throttle having a check valve begins at the pressure fluid reservoir.

The vehicle brake system 10 shown in FIG. 1 has a pedal-actuatable master brake cylinder 11, to which a master brake line 12 of a brake circuit I and a master brake line 13 of a brake circuit 11 are connected. The master brake line 1 branches into brake lines 16 and 17 leading to the wheel brake 14 and 15 of brake circuit I. Brake circuit 11 is equipped accordingly, so it need not be described here.

Brake circuit I (like brake circuit 11) of the vehicle brake system 10 is equipped with an anti-skid system 20, which has respective anti-skid electrically controlled valve assemblies 21 and 22, one of each is disposed in each brake line 16 and 17. The anti-skid valve assemblies 21 and 22, embodied as 3/3-way valves, can be switched electrically by means of an electronic anti-skid control-device 23 Depending on the switching position, the anti-skid valve assemblies 21 and 22 permit the buildup of brake pressure generated in the master brake cylinder 11, in the wheel brakes 14 and 15 (as shown), or in the case of an anti-skid control event they permit reducing the pressure or holding it, i.e., maintaining the brake pressure.

To divert pressure fluid from the wheel brakes 14 and/or 15, a common return feed line 26 is connected to the anti-skid valve assemblies 21 and 22. A throttle 27 is disposed in the return feed line 26. Also connected to the return feed line 26, upstream of the pumping direction from the throttle 27 is a pressure fluid reservoir 28, which is embodied as a cylinder 29 having a piston 31 loaded by a compression spring 30. In the first exemplary embodiment of the invention, the pressure fluid reservoir 28 has a connection opening 32 at a point on its circumference that is overtaken by the piston 31 when the reservoir is approximately half full of pressure fluid. A bypass line 34 that bypasses the throttle 27 and has a one-way check valve 33 leads away from the connection opening 32 to the return feed line 26. This is followed, in the pumping direction of the pressure fluid, by a return feed pump 35, located in the return feed line 26 and having an electric drive motor 36, which is controlled by the anti-skid control device 23. The return feed pump 35 is embodied as a free-piston pump; however, it may also be a fixed displacement pump or a variable displacement pump. After the return feed pump 35, a damper 37 for pressure fluctuations in the pressure fluid is connected to the return feed line 26.

Upon reduction of braking pressure during an anti-skid control event, pressure fluid flows out of the wheel brake 14 and/or 15 through control valves 21 or 22 and the return feed line 26 to the pressure fluid reservoir 28, as mentioned, and fills it at a predetermined pressure that is determined by a counterpressure generated by the counterforce of the compression spring 30. Simultaneously with the pressure reduction event, the anti-skid control device 23 switches the electric drive motor 6 of the return, feed pump 35 on. If the pressure fluid reservoir 28 is only slightly filled with pressure fluid, that is, to less than half of its maximum volumetric capacity, the return feed pump 35 pumps the pressure fluid out of the pressure fluid reservoir 28 with a small pumping flow through the return feed line 26, into the master brake line 12 and back into the master brake cylinder 11.

The small pumping flow exerts only slight feedback on the brake pedal 38 of the master brake cylinder 11. The small pumping flow is attained in the exemplary embodiment of FIG. 1 by providing that the throttle 27 yields the pressure fluid from the pressure fluid reservoir 28 to the return feed pump 35, embodied as a free-piston pump, in delayed fashion. The slight pumping flow can also be attained with a variable displacement pump or a fixed displacement pump operated at reduced rpm, the throttle 27 then being omitted.

Upon pronounced reduction of brake pressure in the wheel brake 14 and/or 15, filling of the pressure fluid reservoir 28 with pressure fluid can occur to such an extent that if hard braking occurs immediately after the anti-skid control event, an inadequate amount of pressure fluid may be present in the master brake cylinder 11. This deficiency is prevented in the exemplary embodiment of FIG. 1 by providing that the piston 31 in the pressure fluid reservoir 28 is positively displaced outward to beyond the connection openings 32, counter to the force of the compression spring 30. The pressure fluid can now escape from the pressure fluid reservoir 28 through the uncovered connection opening 32 and can flow unthrottled through the bypass line 34 and check valve 33 into the return feed line 26 to reach the return feed pump 35. The return feed pump 35, embodied as a free-piston pump, pumps the pressure fluid at an increased volumetric flow back into the master brake cylinder 12. The feedback of the feeding of pressure fluid into the master brake cylinder Il, which has an increased effect on the brake pedal 38, persists until such time as the piston 31, with the pressure fluid level in the pressure fluid reservoir 28 dropping, is moved past the connection opening 32 and blocks the path of the flow via the bypass line 34.

The extent to which the pressure fluid reservoir 28 is filled which is definitive of the size of the pumping flow can also be ascertained by assigning sensors to the pressure fluid reservoir 28 that detect the position of the piston 31. These sensors may be switches actuated by the piston 31. Depending on their signal, if the fill level of the pressure fluid reservoir 28 is high the anti-skid control device 23 can drive the electric drive motor 36 of a return feed pump 35 embodied as a fixed displacement pump at increased rpm, or if it is a variable displacement pump it can vary its pumping volume. A measurement of the pressure prevailing in the pressure fluid reservoir 28 can also be used for pump control, because on the basis of the characteristic curve of the compression spring 30, it is possible to associate the fill level of the pressure fluid reservoir 28 with the outcome of measurement.

The deceleration of the vehicle, measured by the anti-skid control device 23, during an anti-skid control event can also be used for dimensioning the pumping flow of the return feed pump 35. That is, if the vehicle deceleration lessens because brake slip occurs at a wheel, then the brake pressure must be reduced in the applicable wheel brake. If there is a sharp reduction in brake pressure, a large volume of pressure fluid appears, which must be returned to the master brake cylinder by the return feed pump 35 with an increased pumping flow.

As explained above, the pumping flow of the return feed pump 35 can be increased with increasing pressure in the pressure fluid reservoir 28, or when a predetermined fill level in the pressure fluid reservoir is reached, or with increasing volumetric flow of pressure fluid to be pumped back out of the wheel brake 14 and/or 15. These criteria can be used either individually or in combination to control the pumping flow of the return feed pump 35.

Figure 2:
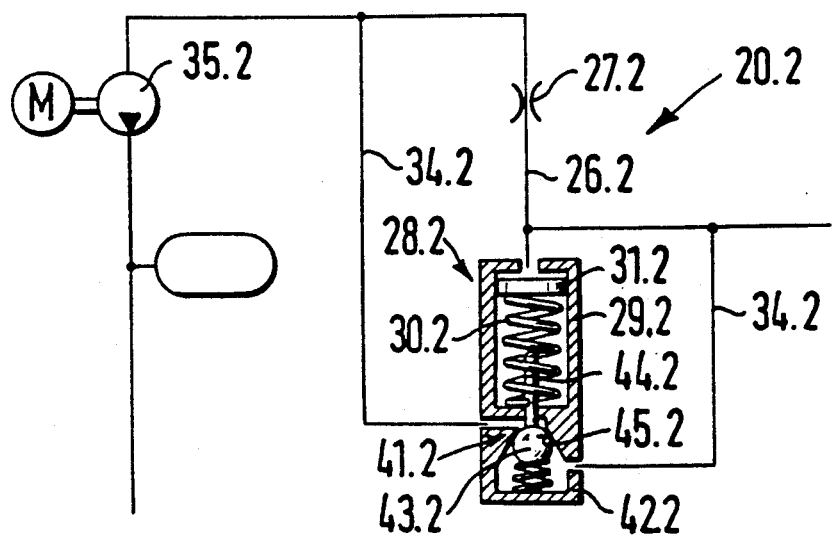
FIG. 2 shows a detail of the diagram of FIG. 1 as a second exemplary embodiment, with a line bypassing the pressure fluid reservoir and the throttle, in which line a shutoff valve actuatable by a movable partition of the pressure fluid reservoir is disposed.

In the exemplary embodiment of FIG. 2, the pumping/flow of the return feed pump 35.2 is controllable as a function of the position of the piston 31.2 of the pressure fluid reservoir 28.2. The anti-skid system 20.2 has a line 34.2 that bypasses the pressure fluid reservoir 28.2 and the throttle 27.2 in the feed line 26.2. Located in this bypass line 34.2 is a shutoff valve 41.2, which is disposed in the housing 42.2 of the pressure fluid reservoir 28.2. The shutoff valve 41.2 has a spring-loaded closing element 43.2 with a tappet 44.2 that protrudes into the cylinder 29.2 of the pressure fluid reservoir 28.2, specifically into the chamber that receives the compression spring 30.2 that engages the piston 31.2. At a predetermined pressure fluid fill level in the pressure fluid reservoir 28.2, the deflected piston 31.2 engages the tappet 44.2 and lifts the closing element 43.2 from the valve seat 45.2 of the shutoff valve 41.2 The shutoff valve 41.2 is thereby switched into its open position, so that pressure fluid that continues to flow through the return feed line 26.2 flows to the return feed pump 35.2, bypassing the throttle 27.2. The return feed pump 35.2, embodied as a free-piston pump, can pump the pressure fluid to the master brake cylinder 11 in an increased pumping flow. As soon as the pressure fluid reservoir 28.2 empties because the inflow of pressure fluid is decreasing, so that the shutoff valve 41.2 closes, the return feed pump 35.2 can pump the pressure fluid, now flowing in through the throttle 27.2, with a reduced pumping flow.

In this exemplary embodiment the piston 31.2 acts as a movable partition of the cylinder 29.2, this partition dividing the cylinder chamber that receives the pressure fluid from the chamber that contains the compression spring 30.2. However, instead of the piston 31.2, a diaphragm can be introduced into the cylinder, in order to separate the two chambers.

Figure 3:
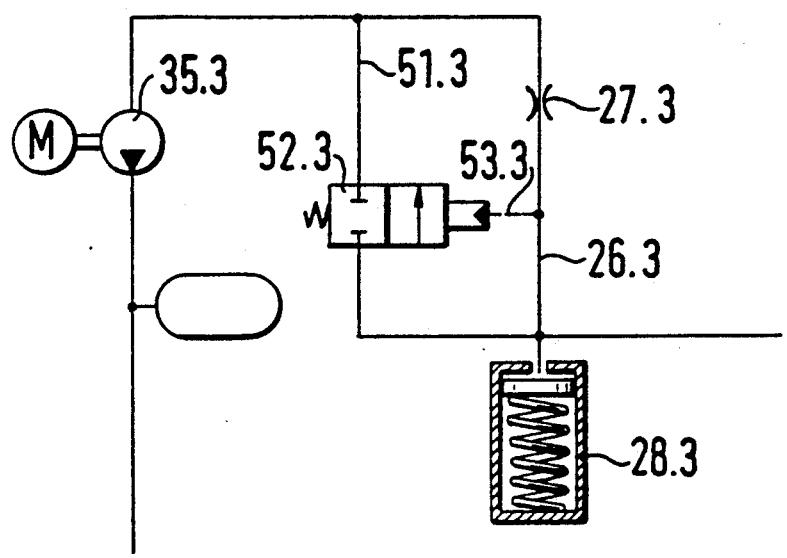
FIG. 3 is a detail of the diagram of FIG. 1 as a third exemplary embodiment, having a bypass line for the throttle that has a pressure-controlled multi-position valve.

In the exemplary embodiment of FIG. 3, a bypass line 51.3 bypassing the throttle 27.3 in the feed line 26.3 is provided with a 2/2-way valve 52.3. The pressure-controllable 2/2-way pressure controlled valve 52.3 is connected to the feed line 26.3 by a control line 53.3 between the throttle 27.3 and the pressure fluid reservoir 28.3. When not otherwise controlled, the 2/2-way valve assumes a blocking position. If there is a pressure in the feed line 26.3 that is equivalent to at least a one-half filling of the pressure fluid reservoir 28.3, then the 2/2-way valve is switched into its open position. Pressure fluid flowing to the pressure fluid reservoir 28.3 upon brake pressure reduction is now supplied unthrottled to the return feed pump 35.3. This pump can pump the pressure fluid with a increased pumping flow to the master brake cylinder 11 of the brake system 10. When there is a reduction in the pressure in the feed line 26.3, the 2/2-way valve 52.3 switches into its blocking position, so that the pressure fluid in the pressure fluid reservoir 28.3 now flows in throttled fashion to the return feed pump 35.3 and from there flows at a reduced pumping flow to the master brake cylinder 11.

Figure 4:
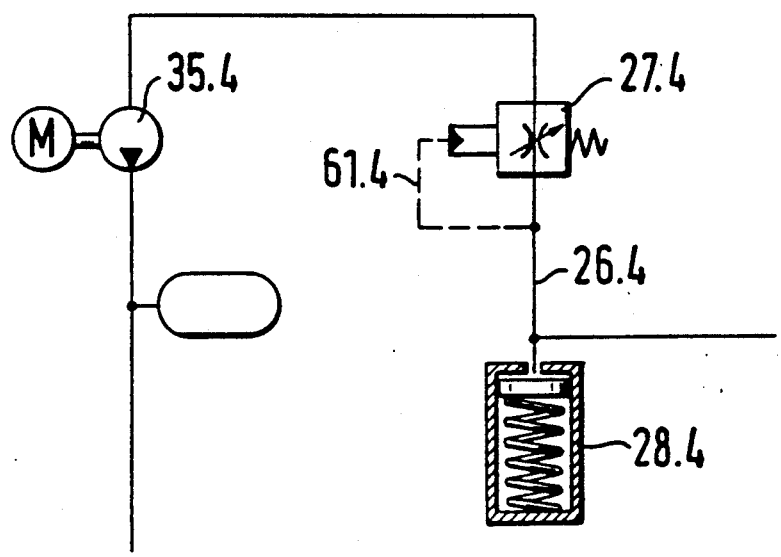
FIG. 4 shows a detail of the diagram of FIG. 1 as the fourth exemplary embodiment with a pressure-adjustable throttle.

The exemplary embodiment of FIG. 4 is achieved with a pressure-adjustable throttle 27.4 in the feed line 26.4/ The feeding of pressure into the throttle 27.4 is effected through a control line 61.4, which is connected to the feed line 26.4 between the pressure fluid reservoir 28.4 and the throttle. The adjustment of the throttling action is therefore effected dependent on the pressure prevailing in the pressure fluid reservoir 28.4. This dependency exists because with increasing pressure as a result of the increasing fill level in the pressure fluid reservoir 28.4, the action of the throttle 27.4 is decreased. At low pressure and with a low fill level in the pressure fluid reservoir 28.4, the return feed pump 35.4 can therefore aspirate pressure fluid in only a slight pumping flow, while with a high fill level in the pressure fluid reservoir and consequent high pressure in the feed line 26.4, because of the decreasing throttling by the throttle 27.4, the pumping flow is increased. With decreasing pressure, the action of the throttle 27.4 increases again.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An anti-skid system (20) which is connected between a master brake cylinder (11) and at least one wheel brake (14) of a vehicle, which comprises an anti-skid valve assembly in a brake line leading from the master brake cylinder to the wheel brake, a fluid return feed line (26) connected to said anti-skid valve assembly, to a pressure fluid reservoir (28), and to a fluid return connection of a feed pump (35) disposed downstream of said pressure fluid reservoir (28), said feed pump is driven by an electric motor for pumping pressure fluid out of said at least one wheel brake to the master brake cylinder (11), a throttle (27) in said return feed line (26) between said feed pump (35) and said pressure fluid reservoir (28), means for controlling the pumping flow of said return feed pump, in which the pumping flow of the return feed pump (35) is increased with increasing pressure in the pressure fluid reservoir (28) with one of either attainment of a predetermined fill level in the pressure fluid reservoir (28) and attainment of an increasing volumetric flow of pressure fluid to be pumped back out of the wheel brake (14).

2. An anti-skid system as defined in claim 1, in which one of either a rpm and the pumping volume of the return feed pump (35) is variable.

3. An anti-skid system as defined by claim 1, in which said pressure fluid reservoir (28) is in the form of a cylinder (29) having a movable piston (31) therein, and the pumping flow of the return feed pump (35) is controllable as a function of the position of the piston (31) within said pressure fluid reservoir.

4. An anti-skid system as defined by claim 1, which includes a cylinder (29) a movable piston (31) that forms a pressure fluid reservoir (28), a line (34) having a check valve (33) is connected to the cylinder (29), said line (34) bypassing the throttle (27), and said line (34) is openable by said piston (31) with the cylinder (29) at least approximately half filled.

5. An anti-skid system as defined by claim 1, having a pressure fluid reservoir (28.2) that includes a movable piston (31.2), a shutoff valve (41.2) provided in a line (34.2) that bypasses the pressure fluid reservoir (28.2) and the throttle (27.2), said shutoff valve can be switched into its open position by said piston (31.2) if the pressure fluid reservoir (28.2) is at least approximately half filled.

6. An anti-skid system as defined by claim 1, which includes a bypass line (51.3) for the throttle (27.3) said bypass line is provided with a pressure actuated 2/2-way valve (52.3), which opens the bypass line at a predetermined pressure in the pressure fluid reservoir (28.3).

7. An anti-skid system as defined by claim 1, in which said throttle (27.4) is pressure-adjustable as a function of the pressure in the pressure fluid reservoir (28.4).

* * * * *